Sept. 25, 1962 J. A. BRENDLE ET AL 3,055,045
CASING CUTTING APPARATUS
Original Filed Feb. 21, 1955 2 Sheets-Sheet 1
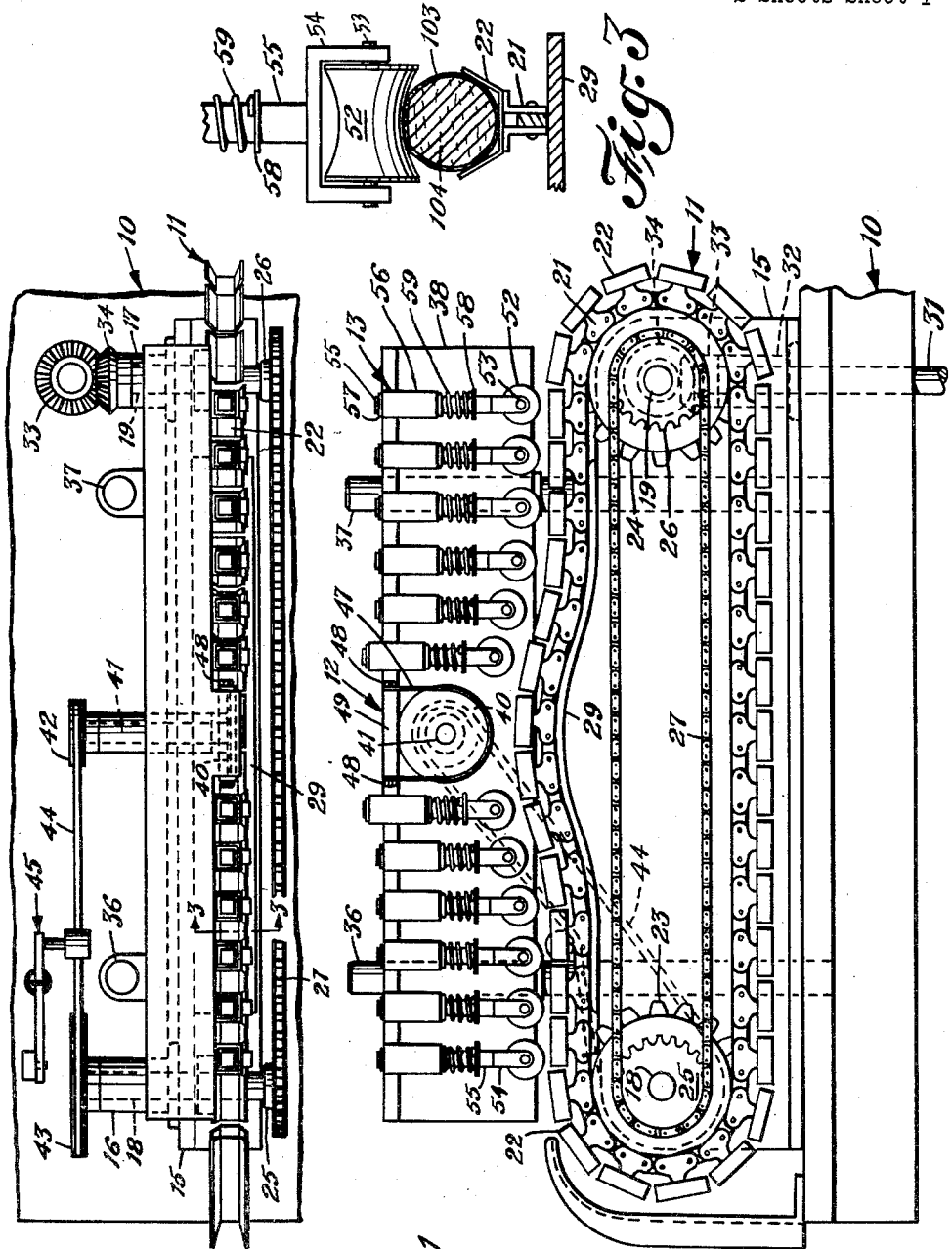
INVENTORS
John A. Brendle
Walter H. Beland
BY
R. G. Story
ATTORNEY INVENTORS
John A. Brendle
Walter H. Beland
BY R. G. Story
ATTORNEY

United States Patent Office 3,055,045
Patented Sept. 25, 1962

3,055,045
CASING CUTTING APPARATUS
John A. Brendle, La Grange, and Walter H. Beland, Chicago, Ill., assignors to Swift & Company, Chicago, Ill., a corporation of Illinois
Original application Feb. 21, 1955, Ser. No. 489,532. Divided and this application Apr. 29, 1958, Ser. No. 731,739
5 Claims. (Cl. 17—1)

The present invention relates to a method and apparatus for cutting the casing about a product that is at least semi-flexible, such as for example a sausage, as a preliminary step to removing the casing from the product. The embodiments of the invention were developed particularly for use in sausage operations and the invention will be discussed particularly with respect to these fields.

With the general public acceptance of casingless sausages there has been a terrific problem in endeavoring to reduce the cost of removing the casings from the sausages after they have been formed. Many machines and processes developed for the removal of the casings involve a step wherein the casing is cut open so that the sausage may be removed from the casing. Difficulties have been encountered in developing a method and apparatus for performing this operation which will be positive in result and yet will not damage the product. Obviously if only some of the casings are cut open or if the cut is incomplete, any subsequent apparatus for removing the casings is likely to jam up or not function properly because of such failure, and any damaged product becomes unsalable at least at a price equal to that at which the undamaged product is sold.

In some instances the product is damaged by reason of the cutting instrument penetrating substantially below the inner surface of the casing. One of the reasons for the difficulty is the fact that the sausages will vary slightly in size even though they ostensibly are uniform, and because they tend to warp, i.e. are not perfectly straight, as a result of the processing operations, with the amount of warpage varying from sausage to sausage. A further problem is introduced by reason of the fact that the sausages have curved ends where they were linked and the cut must extend at least a part way around this end in order to facilitate the removal of the sausage from the casing. The principal object of the present invention is to provide a cutting method and machine that will solve these problems, particularly in high volume mechanical operations.

A further object and advantage is to provide an apparatus that is relatively simple in construction and a method that will permit the utilization of such an apparatus. This not only holds down the capital investment but facilitates and reduces the maintenance requirements.

An additional object of the invention is to provide an apparatus that will hold the casing taut not only to facilitate the cutting but to provide some loosening of the adhesion between the casing and the sausage, thus facilitating the subsequent removal of the sausage from the casing. In one embodiment of this invention the casing is tensioned in two transverse directions, achieving better results in this respect.

Other objects and advantages will become apparent from the following description taken in conjunction with the drawings, in which:

FIGURE 1 is an elevation of an embodiment of the invention;

FIGURE 2 is a plan view of the embodiment of the invention illustrated in FIGURE 1;

FIGURE 3 is an enlarged partial section taken at line 3—3 of FIGURE 2;

Figure 4:
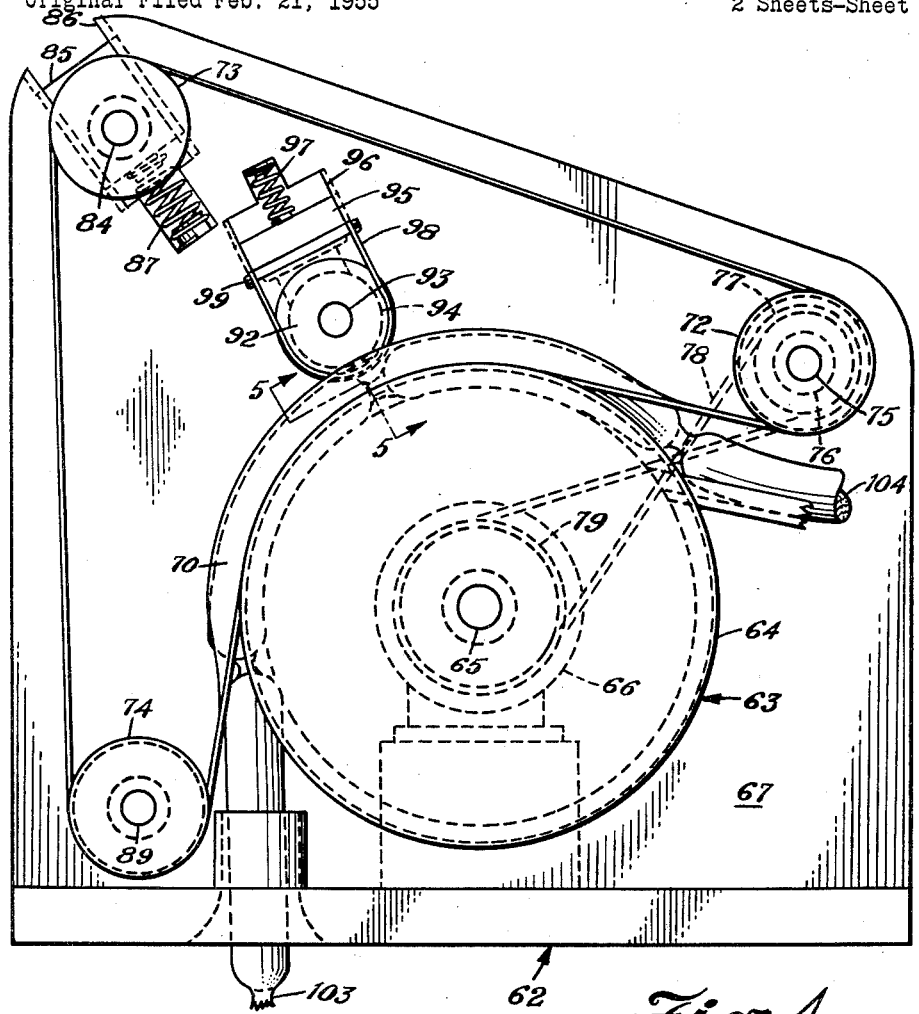
FIGURE 4 is an elevation of a second embodiment of the invention.

The method of the present invention for cutting the casing of a sausage so that the sausage may be removed from the casing comprises bending the sausage into a curve and then drawing the outside, i.e. that portion having the longer radius, of the curved sausage along the cutting edge of a sharp cutting instrument or the equivalent, drawing the cutting instrument past the curved sausage. A knife is used that has a relatively small area of contact with the sausage casing and preferably is a rotary knife, although other forms of knives can be used when positioned in such a manner as to have a relatively small area of contact with the sausage casing. In one embodiment the sausage is not only flexed longitudinally, but the casing is pulled circumferentially away from the knife at the area of cutting to facilitate the cutting and assist in loosening the casing from the sausage.

Referring to FIGURES 1 through 3, the apparatus is mounted on a frame generally 10 and comprises a conveyor generally 11 for transporting the string of sausages, a knife generally 12 for cutting the casings, and hold-down means generally 13 for the string of sausages. Frame 10 includes an upright angle 15 on which are mounted bearings 16 and 17 for shafts 18 and 19, respectively.

A roller chain 21 carrying a plurality of holders 22 serves to do the actual conveying of the string of sausages. The chain rotates about a pair of sprockets 23 and 24, the former being attached to shaft 18 and the latter attached to shaft 19. Shaft 18 also carries a fixed sprocket 25 and shaft 19 carries an identical sprocket 26. A tightly mounted chain 27 passes about both sprockets 25 and 26, the purpose of the chain being to transmit power from shaft 19 to shaft 18 otherwise than through the conveyor chain 21 so as to prevent any whipping or uneven movement of conveyor chain 21.

One of the important features of the present invention is the bending of the sausage into a curved configuration at the time the cutting takes place. In the embodiment of FIGURES 1–3 this is achieved by causing the path of travel of the conveyor 11 and thus the sausages transported by the conveyor to follow a curvilinear path at one portion of the path of travel. To achieve this end the top of angle 15 is cut to form a curve and a curved plate 29 is attached to the top of the angle 15 projecting outwardly underneath chain 21 so that the chain rides on the top of plate 29 with the plate 29 forming a track for the limiting of the movement of the conveyor 11. The curvilinear path that this gives the chain and thus the string of sausages being transported by the chain is readily apparent in the area immediately below the knife 12 in FIGURE 1.

Power is supplied to the machine through shaft 31 from a suitable source of power (not shown). Shaft 31 is journaled in bearing 32 and carries at its upper end a bevel gear 33 which engages a similar bevel gear 34 attached to an end of shaft 19.

Projecting upwardly as a part of frame 10 are a pair of posts 36 and 37 on which slide a carriage 38. Carriage 38 carries both the knife 12 and the hold-down means 13. Knife 12 comprises a rotary knife blade 40, having a circular cutting edge in a single plane, attached to one end of a shaft 41. Shaft 41 is suitably journaled in carriage 38. At the other end of shaft 41 is a sheave 42 which is driven by a larger sheave 43 attached to the end of shaft 18 through a belt 44. A belt tightener generally 45 is used to pull the belt 44 in engagement with the sheaves and at the same time permit vertical movement of the carriage 38. While the tightener 45 will permit vertical movement it will also exert downward pressure on the belt 44 and thereby tend to urge the carriage 38 downwardly.

About the portion of knife 40 nearest conveyor 11 is a knife guard 47. As will be seen, the knife 40 projects through the guard 47 in the direction of the conveyor 11 a very short distance. This distance is adjusted to an amount just sufficient to slit the casing about the sausages but insufficient to project into the sausages an amount that will cause any damage to the product. The amount of this projection of knife 40 beyond guard 47 is adjusted by means of the mounting of the guard 47 on carriage 38. The two upper ends of the guard 47 are adjustably secured to the carriage 38 in any suitable well-known matter, such as by adjustable bolts 48 threaded into a boss 49 on carriage 38. By loosening bolts 48 the guard may be adjusted vertically by sliding the slots in the guard along bolts 48 until the correct extension of knife 40 through the guard 47 is obtained. Bolts 48 are then tightened to lock the guard in place.

The hold-down means 13 comprises a plurality of rollers 52 with axial shafts 53 journaled in yokes 54. Yokes 54 are mounted on the ends of square rods 55 slidably received in holders 56 attached to carriage 38. Lock washer 57 at the upper end of rods 55 limits the downward movement of the rollers 52. A second lock washer 58 adjacent the yoke 54 forms an abutment for springs 59 which are compressed between the lock washers 58 and the lower of holders 56. The hold-down means in cooperation with the guard 47 causes the string of sausages to conform to the configuration of conveyor 11, particularly as the conveyor and string of sausages pass over the curvilinear section of the track formed by plate 29. As a result of the bending of the sausages about the curvilinear portion of the path of movement as defined by track 29, the knife 40 commences cutting down on the end of the sausage, passes across one side and then cut down across a portion of the following end of the sausage.

Carriage 38 floats on rods 36 and 37. The tension of springs 59 is adjusted with respect to the weight of carriage 38 so that the guard 47 rides on the top of the sausages with sufficient pressure to bend the sausages to conform to the curvilinear portion of the conveyor 11 as defined by track 29. This weight of the carriage 38 thus resiliently urges the sausages into the holders 22 to obtain the desired flexing of the sausages.

Figure 5:
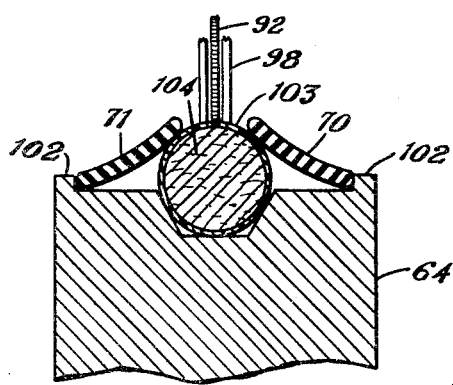
FIGURE 5 is an enlarged section taken at line 5—5 of FIGURE 4.

Referring to FIGURES 4 and 5, this embodiment comprises a frame generally 62 with the conveyor generally 63 taking the form of a wheel or sheave 64. Wheel 64 is mounted on the shaft 65 of a slow speed motor 66 mounted on frame 62. Shaft 65 projects through an erect plate 67 forming a part of frame 62 with the wheel 64 being on one side of the plate and the motor 66 being on the opposite side.

A pair of rubber belts 70 and 71 are used to resiliently urge the sausages against wheel 64. Belts 70 and 71 pass about three pulleys 72, 73 and 74. Pulley 72 is mounted on a shaft 75 journaled in a bearing 76 attached to plate 67. At the other end of the shaft 65 is attached another pulley 77 which is driven by a belt 78 from a pulley 79 on shaft 65. Pulley 73 is an idler pulley serving as a belt tightener and rotates on a shaft 84 secured to a block 85 movable in ways 86 in plate 67. A spring 87 urges block 85 outwardly to hold 70 and 71 taut.

Pulley 74 is also an idler and rotates on a shaft 89 attached to plate 67.

A rotary saw-toothed knife blade 92 is attached to shaft 93 of motor 94. The knife blade is given a floating mounting and is urged towards the wheel 64 by attaching motor 94 to a block 95 that slides in ways 96 in plate 67. A spring 97 urges block 95 in the direction of the wheel 64. A knife guard 98 is attached to block 95 by means of bolts 99 with the same adjustable feature as previously described with respect to guard 47 to permit an adjustment in the amount that blade 92 projects beyond guard 98.

One feature of the present invention can be seen with reference to FIGURE 5. Here it will be noted that the outer edges of belts 70 and 71 bear against abutments 102 on wheel 64. The belts are held taut by idler pulley 73 and pull downwardly away from the edge of knife blade 92, drawing the casing 103 of sausage 104 away from the edge of knife blade 92. Thus the sausage casing is flexed in two direction, facilitating the cutting of the casing 103 and the loosening of the casing from the sausage 104.

After the casing is cut by the method and apparatus of the present invention the casing may then be removed from the sausage by various structures as for example that illustrated and described in Patent No. 2,644,979, the disclosure of which is incorporated herein by reference.

Various modifications of the invention will be apparent to those skilled in the art and such modifications are deemed to be a part of the invention to the extent that they are included in the appended claims. The description of specific embodiments was solely for the purpose of complying with 35 U.S.C. 112. As previously mentioned, the invention was described as applying to sausage products although it could also be applied in other fields where similar problems are encountered with respect to the removal of a casing from a product that is at least semi-flexible. The term casing is intended to apply to situations where a "skin" is found about the product. The casing might be one of any number of materials some of which might be a natural product and others of which might be synthetic materials.

This is a division of our co-pending application Serial No. 489,532, filed February 21, 1955, now abandoned.

We claim:

1. A device for cutting the casing enclosing generally cylindrical flexible objects having curvilinear ends, said device including a frame, an endless conveyor mounted on said frame, supporting means on said conveyor to hold said objects longitudinally with respect to said conveyor, a track attached to said frame and supporting said conveyor along at least a portion thereof, a portion of said track being curvilinear, a carriage mounted on said frame for movement toward and away from said conveyor, said carriage being biased to move toward said conveyor, a rotary knife having a circular cutting edge mounted on said carriage at the opposite side of said conveyor from said track and positioned opposite said curvilinear portion of said track and between the ends of said curvilinear portion, a guard mounted on said carriage and positioned about at least the portion of said knife adjacent said conveyor with the cutting edge of said knife projecting beyond said guard in the direction of said conveyor, a plurality of rollers resiliently mounted on said carriage in alignment with said path and extending in opposite directions in line with the cutting edge of said knife to bear against the objects on said conveyor whereby said objects will assume the curvilinear shape of said track during all times when in contact with said knife, and power means connected to said knife to rotate said knife and to said conveyor to move said objects along said path.

2. A device for cutting the casing enclosing cylindrical flexible objects having curvilinear ends, said device including a frame, a wheel rotatively mounted on said frame, moving means to hold said objects against the periphery of the wheel along a portion of the periphery thereof whereby said objects will assume the curvilinear shape of said wheel throughout said portion, said means including a pair of endless belts trained for movement about parallel paths a portion of which pass to either side of said objects held against said portion of the periphery of the wheel, a rotary knife mounted on said frame and positioned adjacent and between the ends of said portion of said periphery of the wheel intersecting the casing of the objects between said endless belts, a guard about at least the portion of said knife adjacent said wheel with the cutting edge of said knife projecting beyond said guard in the direction of said wheel, said knife and guard being resiliently urged toward said wheel, and power means connected to the wheel and the knife to rotate the wheel and the knife.

3. A device for cutting the casing enclosing generally cylindrical flexible objects having curvilinear ends, said device including a frame, a rotary knife having a circular cutting edge mounted on said frame, an object conveyor mounted on said frame and trained to move said objects longitudinally past said knife along a fixed curvilinear path substantially coplanar with said cutting edge, said knife intersecting the casing of the objects between the ends of said curvilinear path, means urged toward said conveyor and positioned substantially parallel thereto extending in two directions beyond the cutting edge of said knife to hold said objects against said conveyor throughout the curvilinear path during all times when said knife is in contact with said objects, and power means connected to said knife to rotate said knife and to said conveyor to move said objects along said path.

4. The device of claim 3 wherein the means urged toward said conveyor comprises a plurality of rollers reciprocally mounted on said frame substantially parallel to said conveyor to engage the sides of said objects opposite said conveyor.

5. The device of claim 3 wherein the means urged toward said conveyor comprises a pair of endless belts trained for movement about paths a portion of which pass parallel to said conveyor and to either side of said knife along said curvilinear path.

References Cited in the file of this patent

UNITED STATES PATENTS

| | | |
|---|---|---|
| 2,360,363 | Pope | Oct. 17, 1944 |
| 2,369,360 | Martin | Feb. 13, 1945 |
| 2,644,979 | Ball | July 14, 1953 |
| 2,699,570 | Chambers et al. | Jan. 18, 1955 |
| 2,779,968 | Hensgen | Feb. 5, 1957 |